United States Patent
Raikin et al.

(10) Patent No.: US 9,632,901 B2
(45) Date of Patent: Apr. 25, 2017

(54) PAGE RESOLUTION STATUS REPORTING

(71) Applicant: Mellanox Technologies Ltd., Yokneam (IL)

(72) Inventors: Shlomo Raikin, Kibbutz Yassur (IL); Shachar Raindel, Haifa (IL); Noam Bloch, Bat Shlomo (IL); Liran Liss, Atzmon (IL)

(73) Assignee: MELLANOX TECHNOLOGIES, LTD., Yokneam (IL)

( * ) Notice: Subject to any disclaimer, the term of this patent is extended or adjusted under 35 U.S.C. 154(b) by 85 days.

(21) Appl. No.: 14/846,870

(22) Filed: Sep. 7, 2015

(65) Prior Publication Data

US 2016/0077946 A1 Mar. 17, 2016

Related U.S. Application Data

(60) Provisional application No. 62/048,826, filed on Sep. 11, 2014.

(51) Int. Cl.
| | |
|---|---|
| *G06F 11/30* | (2006.01) |
| *G06F 12/10* | (2016.01) |
| *G06F 13/16* | (2006.01) |
| *G06F 13/38* | (2006.01) |
| *G06F 12/08* | (2016.01) |
| *G06F 12/1009* | (2016.01) |
| *G06F 12/109* | (2016.01) |
| *G06F 12/0891* | (2016.01) |

(52) U.S. Cl.
CPC ...... *G06F 11/3065* (2013.01); *G06F 12/0891* (2013.01); *G06F 12/109* (2013.01); *G06F 12/1009* (2013.01); *G06F 13/1663* (2013.01); *G06F 13/385* (2013.01); *G06F 2212/653* (2013.01); *G06F 2212/657* (2013.01)

(58) Field of Classification Search
CPC ............ G06F 11/3065; G06F 12/1009; G06F 12/109; G06F 13/1663; G06F 13/385; G06F 12/0891; G06F 2212/653; G06F 2212/657
See application file for complete search history.

(56) References Cited

U.S. PATENT DOCUMENTS

| | | |
|---|---|---|
| 6,321,276 B1 | 11/2001 | Forin |
| 8,051,212 B2 | 11/2011 | Kagan et al. |

(Continued)

OTHER PUBLICATIONS

PCI Express® Base Specification, Revision 3.1, 1073 pages, Mar. 14, 2014.

(Continued)

*Primary Examiner* — Idriss N Alrobaye
*Assistant Examiner* — Ronald Modo
(74) *Attorney, Agent, or Firm* — D. Kligler Services Ltd.

(57) ABSTRACT

A method for data transfer includes receiving in a data transfer operation data to be written by a peripheral device to a specified virtual address in a random access memory (RAM) of a host computer. Upon receiving the data, it is detected that a page that contains the specified virtual address is marked as not present in a page table of the host computer. The peripheral device receives a notification that the page is not present and an estimate of a length of time that will be required to make the page available and selects a mode for handling of the data transfer operation depending upon the estimate.

32 Claims, 2 Drawing Sheets

(56) References Cited

U.S. PATENT DOCUMENTS

| | | | | |
|---|---|---|---|---|
| 8,255,475 B2* | 8/2012 | Kagan | ............... | G06F 12/1072 |
| | | | | 709/212 |
| 8,914,458 B2 | 12/2014 | Raindel et al. | | |
| 2004/0221128 A1 | 11/2004 | Beecroft et al. | | |
| 2007/0204117 A1* | 8/2007 | Van Riel | ............... | G06F 12/023 |
| | | | | 711/159 |

OTHER PUBLICATIONS

Single Root I/O Virtualization and Sharing Specification, Revision 1.1, 90 pages, Jan. 20, 2010.
Joshi, K.R., "Linux Memory Management", COM W4118, 38 pages, Columbia University, Apr. 3, 2013 http://www.cs.columbia.edu/˜krj/os.
I/O Page Faults, Paper #22, 14 pages, Mar. 27, 2015.
PCT Express Address Translation Services (ATS) Specification, Revision 1.1, 54 pages, Jan. 26, 2009.

* cited by examiner

PAGE RESOLUTION STATUS REPORTING

CROSS-REFERENCE TO RELATED APPLICATIONS

This application claims the benefit of U.S. Provisional Patent Application 62/048,826, filed Sep. 11, 2014, which is incorporated herein by reference.

FIELD OF THE INVENTION

The present invention relates generally to computer systems, and specifically to handling of input/output (I/O) operations.

BACKGROUND

Computer operating systems use virtual memory techniques to permit application programs to address a contiguous working memory space, even when the corresponding physical (machine) memory space is fragmented and may overflow to disk storage. The virtual memory address space is typically divided into pages, and the computer memory management unit (MMU) uses page tables to translate the virtual addresses of the application program into physical addresses. The virtual address range may exceed the amount of actual physical memory, in which case disk storage space is used to save ("swap out") virtual memory pages that are not currently active. When an application attempts to access a virtual address that is absent from the physical memory, the MMU raises a page fault exception (commonly referred to simply as a "page fault"), which causes the operating system to swap the required page back from the disk into the memory. Other uses of page faults in memory management are also known in the art.

I/O devices usually use physical memory addresses in order to access host memory, but some virtual memory addressing techniques for I/O have been developed. For example, the PCI-SIG organization (Beaverton, Oreg.) has developed a set of I/O Virtualization (IOV) specifications. The PCI-SIG Address Translation Services (ATS) specifications, including ATS 1.0 and 1.1, provide a set of transactions for PCI Express® (PCIe) components to exchange and use translated addresses in support of native I/O Virtualization. ATS includes a Page Request Interface (PRI) extension, which can be used by I/O devices to request the services of the host memory manager, for instance in resolving pages of virtual memory that the I/O device (or an associated IOMMU) was unable to translate into corresponding physical pages.

Some virtual memory addressing techniques for I/O have been described in the patent literature. For example, U.S. Pat. No. 6,321,276 describes methods and systems for processing input/output requests including virtual memory addresses. A "recoverable I/O request processor" translates virtual memory addresses to physical memory addresses utilizing translation tables local to an I/O device. If a local translation fails, the I/O request processor requests virtual address mapping information from the operating system.

U.S. Patent Application Publication 2004/0221128, whose disclosure is incorporated herein by reference, describes virtual-to-physical memory mapping in network interfaces. A plurality of processing nodes in a network have respective addressable memories and respective network interfaces. Each network interface includes a memory management unit with at least one mapping table for mapping virtual addresses to the physical addresses of the addressable memory of the respective processing node.

U.S. Pat. No. 8,255,475, whose disclosure is incorporated herein by reference, describes an I/O device that includes a host interface, for connection to a host device having a memory, and a network interface, which is configured to receive, over a network, data packets associated with I/O operations directed to specified virtual addresses in the memory. Packet processing hardware is configured to translate the virtual addresses into physical addresses and to perform the I/O operations using the physical addresses. Upon an occurrence of a page fault in translating one of the virtual addresses, the I/O device transmits a response packet over the network to a source of the data packets so as to cause the source to refrain from transmitting further data packets while the page fault is serviced.

U.S. Pat. No. 8,914,458, whose disclosure is incorporated herein by reference, describes devices and methods for I/O memory management that are compatible with and facilitate the use of virtual memory. In some embodiments, an I/O device, such as a NIC, is configured to send and receive, over network transport connections, data packets associated with I/O operations that are directed to specified virtual addresses in a host memory. Packet processing hardware in the I/O device translates the virtual addresses into physical addresses and carries out the I/O operations using the physical addresses. When a page fault occurs, the I/O device may interact with the host operating system (OS), and possibly with user application programs running on the host, in order to minimize delay in handling the present page fault and/or avoid page faults in subsequent I/O operations.

SUMMARY

Embodiments of the present invention that are described hereinbelow provide techniques for efficient handling of page faults incurred by I/O devices.

There is therefore provided, in accordance with an embodiment of the invention, a method for data transfer, which includes receiving in a data transfer operation data to be written by a peripheral device to a specified virtual address in a random access memory (RAM) of a host computer. When it is detected, upon receiving the data, that a page that contains the specified virtual address is marked as not present in a page table of the host computer, the peripheral device receives a notification that the page is not present and an estimate of a length of time that will be required to make the page available. A mode for handling of the data transfer operation is selected depending upon the estimate, and the data transfer operation is completed in accordance with the selected mode.

In some embodiments, detecting that the page is marked as not present includes looking up a page entry in a page table, and finding the page entry to be invalid. In one embodiment, receiving the notification includes reading the estimate from the page entry, wherein the estimate is written to the page table by an operating system of the host computer.

Additionally or alternatively, receiving the notification includes submitting a page request from the peripheral device to an operating system of the host computer, and receiving a response from the operating system providing the estimate.

In some embodiments, receiving the estimate includes receiving an indication of a location of the page that is not present, and estimating the length of time that will be required to swap the page back into the RAM depending upon the location. Typically, the location is selected from a list of locations consisting of a page cache in the RAM, a quick-swap device, and a disk.

In a disclosed embodiment, completing the data transfer operation includes scheduling a time for completion of the data transfer operation after the estimated length of time has elapsed, and suspending the data transfer operation until the scheduled time.

In some embodiments, selecting the mode includes, when the estimated length of time is less than a predefined limit, buffering the data in a local memory of the peripheral device until the page has been swapped back into the RAM. Additionally or alternatively, selecting the mode includes, when the estimated length of time is greater than a predefined limit, stalling the data transfer operation for a delay period selected responsively to the estimate. When the data transfer operation includes reception of data transmitted over a network to the peripheral device, stalling the data transfer operation may include sending a control message over the network to a source of the data so as to inhibit further transmission during the delay period.

In some embodiments, receiving the estimate of the length of time includes reading a value from a global register and applying the value in making the estimate. In a disclosed embodiment, the value read from the global register is indicative of a memory pressure experienced by an operating system of the host computer. In one embodiment, the global register resides in the RAM of the host computer. Additionally or alternatively, reading the value from the global register includes selecting the global register for use in making the estimate according to a page table entry associated with the specified virtual address. Further additionally or alternatively, making the estimate includes adding the value read from the global register to a latency estimation provided in a page table entry associated with the specified virtual address.

There is also provided, in accordance with an embodiment of the invention, a method for data transfer, which includes receiving in a host computer page requests from a peripheral device coupled to the host computer with respect to specified pages of virtual memory in a random access memory (RAM) of the host computer. Notifications are provided from the host computer to the peripheral device with respect to whether the specified pages are present in the RAM. For the pages that are not present, the host computer provides to the peripheral device estimates of lengths of time that will be required to swap the pages back into the RAM.

In some embodiments, providing the notifications includes invalidating page entries corresponding to the pages that are not present in a page table maintained by the host computer, and providing the estimates includes writing indications in the invalidated page entries of the lengths of time required to swap the corresponding pages back into the RAM. Alternatively or additionally, providing the estimates includes sending page resolution notifications from the host processor to the peripheral device.

There is additionally provided, in accordance with an embodiment of the invention, data transfer apparatus, including a host interface for connection to a host processor having a random access memory (RAM) and one or more swap devices, and a network interface, which is configured to receive data sent over a network and destined for a specified virtual address in the RAM. Processing circuitry, coupled between the host interface and the network interface, is configured to detect that a page that contains the specified virtual address is marked as not present in a page table maintained by the host processor, to receive an estimate of a length of time that will be required to swap the page back into the RAM, to select a mode for handling of the data depending upon the estimate, and to handle the data in accordance with the selected mode.

There is additionally provided, in accordance with an embodiment of the invention, a method for data transfer, which includes receiving, in a data transfer operation of a given type, data to be written by a peripheral device to a specified virtual address of a host computer. When it is detected, upon receiving the data, that a page that contains the specified virtual address is marked as not accessible for the given type of operation or as not present in a page table of the host computer, the peripheral device receives a notification that the page is not available and an estimate of a length of time that will be required to make the page available. A mode for handling of the data transfer operation is selected depending upon the estimate. The data transfer operation is completed in accordance with the selected mode.

There is further provided, in accordance with an embodiment of the invention, a method for data transfer, which includes receiving in a host computer page requests from a peripheral device coupled to the host computer with respect to specified pages of virtual memory in the host computer for operations of a given type to be performed by the peripheral device. Notifications are provided from the host computer to the peripheral device with respect to whether the specified pages are present and are available for the given type of operation. For the pages that are not present or are not available, the host computer provides to the peripheral device estimates of lengths of time that will be required to make the pages available.

The present invention will be more fully understood from the following detailed description of the embodiments thereof, taken together with the drawings in which:

DETAILED DESCRIPTION OF EMBODIMENTS

Figure 1:
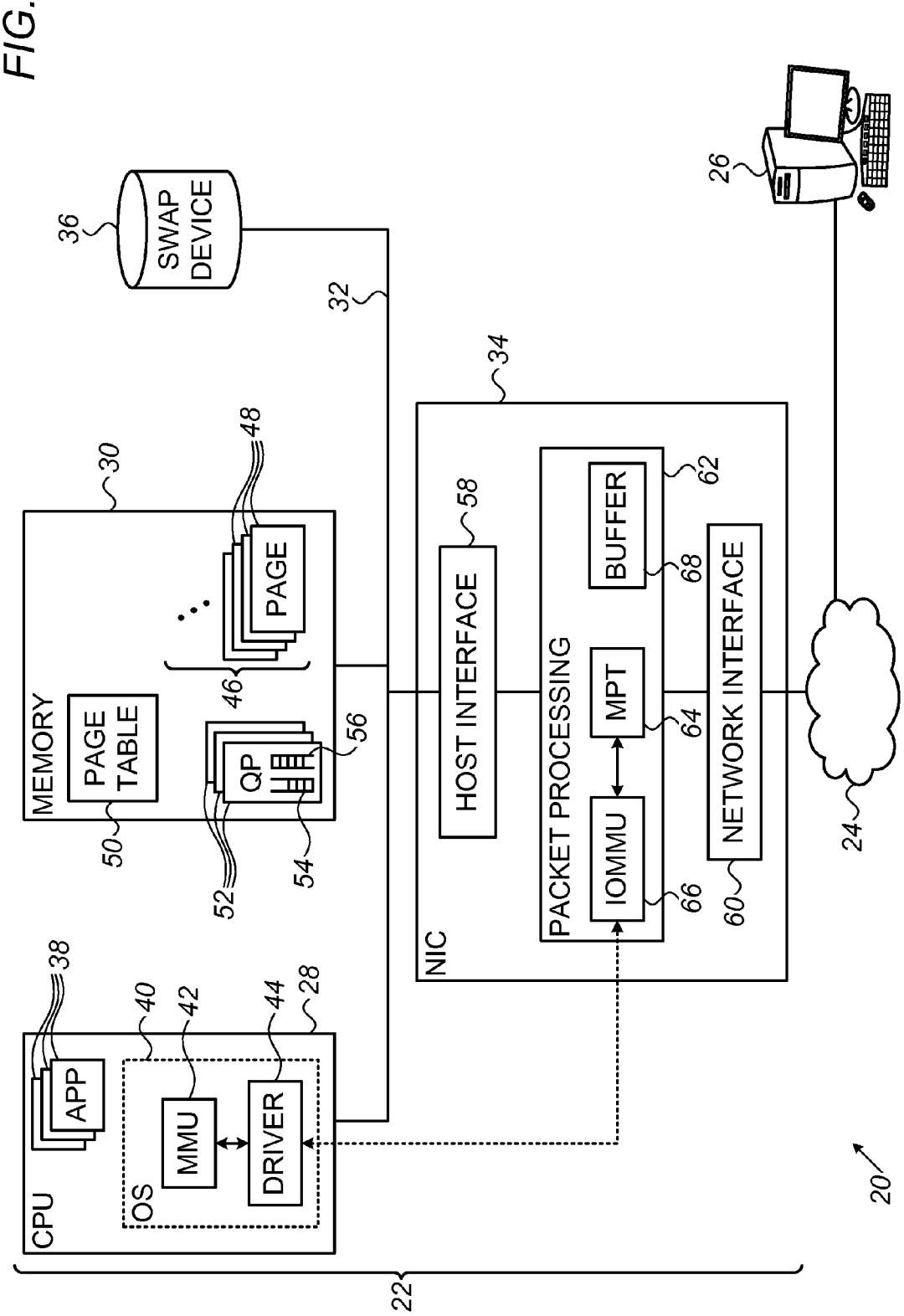
FIG. 1 is block diagram that schematically illustrates a computer system, in accordance with an embodiment of the invention.

The above-mentioned U.S. Pat. No. 8,255,475 describes an I/O device, such as a network interface controller (NIC), which responds to a page fault in handling an incoming data packet by transmitting a response packet over the network to the source of the data packet so as to cause the source to refrain from transmitting further data packets while the page fault is serviced. For example, if the NIC is an InfiniBand host channel adapter (HCA), the response packet may be a receiver not ready (RNR) negative acknowledgment (NACK) packet, which specifies a length of time that the packet source should wait before resuming transmission. The packet source waits either until it has received another packet (such as an unsolicited ACK) from the HCA or until the specified timeout period has elapsed, and then retransmits its packets, starting from the packet that engendered the RNR NACK response from the receiver. Meanwhile, service on other queue pairs (transport service instances, referred to as "QPs") by the HCA is substantially unaffected.

Embodiments of the present invention that are described herein improve on this model by enabling the I/O device to judge in advance the length of time for which a given service instance is to be delayed by a required page swap, and to decide accordingly how to handle the data transfer operation (also referred to herein as an I/O operation) that incurred the page fault. The component of the host complex (such as the memory management unit—MMU—or other operating system component) that is responsible for servicing page requests not only informs the I/O device whether a requested page of virtual memory is present or absent from the physical random access memory (RAM), but also, when the page is absent, gives an estimate of the time that will be required swap the desired page into the RAM. The estimate may be given in terms of the actual time that will be required to complete the page swap, or it may comprise an indication of the location of the page—in a page cache in RAM, a quick swap device, or a disk, for example—which is known to have a certain swap latency and thus represents the estimated swap time.

In the disclosed embodiments, an I/O device handles I/O requests involving data to be written to specified virtual addresses in RAM of a host computer. When the page containing a virtual address that is specified in a given I/O request is swapped out of the RAM, the I/O device receives a notification that the page is swapped out and an estimate of the length of time that will be required to swap the page back into the RAM. (Various means and techniques are described hereinbelow for detecting that the page is swapped out and for providing the notification to the I/O device.) The I/O device then selects a mode for handling of the I/O operation depending upon the estimate, and completes the I/O operation accordingly.

For example, the I/O device may schedule a time for completion of the I/O operation, to occur after the estimated length of time to swap in the desired page has elapsed, and may suspend the I/O operation until the scheduled time. When the estimated length of time is less than some limit, the I/O device may buffer the data in a local memory until the page has been swapped back into the RAM. On the other hand, when the estimated length of time is greater than a certain limit, the I/O device may stall the I/O operation for a delay period selected based on the estimate.

In some system implementations, an element of the host complex, such as the MMU or another operating system component, maintains a page table, in which the I/O device or an entity associated with the I/O device (such as an IOMMU) is able to look up virtual addresses specified in I/O requests. When a page has been swapped out, the corresponding page table entry will be marked invalid, as is known in the art. In an embodiment of the present invention, however, when a page table entry is invalidated, the host complex writes an estimate of the length of time that will be needed to swap the page back into RAM, and this estimate is then available to be read out to the I/O device. This approach provides an efficient means for using existing data structures to provide the added swap delay information to the I/O device.

Alternatively or additionally, when the I/O device submits a request for resolution of a page of virtual memory to the operating system of the host computer, and the request incurs a page fault, the operating system responds with a message that includes an estimate of the length of time that will be required to swap the page back into the RAM. For example, the page request and response may be exchanged in a PCIe bus transaction using the PRI messaging format of the above-mentioned ATS specification, with suitable additions to the protocol to report page swap time estimates.

Some of the scenarios and methods that are described herein make reference to handling of virtual addresses in pages that are swapped out of the host memory. More generally, however, the present methods are applicable in substantially any case in which a desired page is not present in the page table maintained by the host processor. For example, these methods can also be used to handle cases in which a page is actually available in the host memory, but the mapping for the page has not been updated.

The embodiments that are described hereinbelow relate, for the sake of concreteness and clarity, to a particular type of I/O device: a NIC, which connects a host computer to a packet network. The principles of the present invention, however, are likewise applicable, mutatis mutandis, to peripheral devices and data transfer operations of other types that use virtual addressing. For example, storage controllers can schedule storage accesses according to such information. Additionally, GPUs (graphics processing units) can take the expected latency into account to optimize throughput in scheduling the computation of a graphic frame. Task-specific accelerators, such as FPGAs or GPUs used for computational acceleration (GPGPUs), can make similar scheduling decisions, deciding whether to schedule a different mission in or to block until a certain page is available.

Furthermore, although the embodiments described below relate mainly to operations involving the host RAM and the presence or absence of requested pages in the host RAM, the principles of the present invention are similarly applicable to data stored in other sorts of memory. The estimates of time required to make a page available to a peripheral device may apply not only to whether or not the page is present in memory (whether RAM or other memory), but also to whether the page is available for the type of operation that is to be performed by the peripheral device.

FIG. 1 is block diagram that schematically illustrates a computer system 20, in accordance with an embodiment of the invention. System 20 comprises a host computer 22, which communicates over a packet network 24, such as an InfiniBand fabric or an Ethernet network, with a peer computer 26 or other data source. (Typically, computer 22 communicates over network 24 with many peer computers and other entities, but only one is shown in the figure for the sake of simplicity.) Computer 22 comprises a host processor 28, which typically comprises a general-purpose central processing unit (CPU), and a system memory 30, typically comprising RAM. A network interface controller (NIC) 34 connects computer 22 to network 24. Processor 28 and memory 30 are connected to NIC 34 by a host bus 32, such as a PCIe bus under the control of a suitable memory controller (not shown), as is known in the art.

Processor 28 runs an operating system (OS) 40 and application programs 38 (referred to simply as "applications"). The software running on the processor, including both the operating system and application programs, may be downloaded in electronic form, over a network for example. Additionally or alternatively, the software may be stored on tangible, non-transitory computer-readable media, such as optical, magnetic or electronic memory media. Computer 22 (including NIC 34) may support a virtual machine environment, using a two-stage address translation process, as described, for example, in the above-mentioned U.S. Pat. Nos. 8,255,475 and 8,914,458. The techniques of page resolution and handling of page faults that are described herein may readily be applied in this sort of virtualized environment, in which NIC 34 interacts with both host and guest operating systems and applications running in both host and guest domains. For the sake of simplicity, however, the description that follows will be limited to the host domain.

Memory 30 holds program instructions and application data 46, and may also hold metadata structures, such as queue pairs (QPs) 52, that are accessed and used by NIC 34 in managing data transfer operations. (Alternatively, these metadata structures may be stored elsewhere, such as in a dedicated memory within or attached to the NIC.) Applications 38 running on processor 28, as well as NIC 34 itself, use virtual addressing to access application data 46 in memory 30.

Typically, the virtual memory space that is allocated by operating system 40 to applications 38 can exceed the actual amount of space available in memory 30. A memory management unit (MMU) 42 therefore detects and notifies the operating system when page faults occur. The operating system swaps pages 48 of application data 46 into memory 30 when they are needed and out to one or more swap devices 36 when they are not. Operating system 40 updates a page table 50 to indicate respective locations of pages 48 of virtual memory that are currently present in memory 30 and to invalidate pages that are swapped out. Swap devices 36 typically include, for example, a mass-storage device, such as a disk, and/or a quick-swap device, such as a flash or other high-speed non-volatile memory. In some operating systems, such as Linux, unused areas of memory 30 are used as a page cache, to hold pages of data, originating from or destined for swap devices 36, that are not currently mapped to virtual memory pages.

NIC 34 is connected to bus 32 by a host interface 58, comprising circuitry that enables the NIC to read and write data directly to and from memory 30. A network interface 60 comprises one or more ports for connection to network 24. Packet processing circuitry 62 in the NIC assembles and transmits outgoing packets to network 24 and handles incoming packets from the network in accordance with instructions received from host processor 28. These functions include constructing data packets containing data gathered from memory 30 for transmission over network 24, as well as acknowledging incoming packets from network 22 and scattering the data contained in the packets to memory 30. The functions of the NIC are typically implemented in dedicated hardware circuits, such as those described, for example, in U.S. Pat. No. 8,051,212, whose disclosure is incorporated herein by reference. For the sake of clarity and simplicity in the following description, some aspects of the operation of NIC 34 are described herein using InfiniBand terminology, but the present techniques are similarly applicable to other communication protocols and to other types of I/O requests that use virtual memory addresses. In alternative embodiments, some or all of the NIC functionality is implemented as software running on host processor 28, typically in the context of the operating system or the hypervisor, but possibly also in the applications context.

Client processes, such as applications 38 running on computer 22, communicate with the transport layer of network 24 via NIC 34 by manipulating a transport service instance, known as a QP 52, which is made up of a send queue 54 and a receive queue 56. A given client process may open and use multiple QPs simultaneously. To send and receive communications over network 22, the client process initiates work requests (WRs), which causes work items, referred to as work queue elements (WQEs), to be placed in the appropriate queues for execution by the NIC. Applications 38 can thus invoke, inter alia, remote direct memory access (RDMA) read and write operations, which cause NIC 34 to read and write data directly between addresses in memory 30 and network 24.

Typically, the memory ranges for at least some of these data transfer operations are specified in terms of virtual memory addresses, which are translated by NIC 34 into physical addresses in memory 30. For this purpose, a NIC driver 44 in operating system 40 assigns memory protection keys and virtual address spaces for use by the respective QPs. The driver loads the address translation tables into an I/O memory management unit (IOMMU) 66 and loads the keys into a memory protection and translation (MPT) unit 64, for use by NIC 34 in servicing work items in the QP. Although for the sake of conceptual clarity, MPT unit 64 and IOMMU 66 are shown in FIG. 1 as separate entities, in practice these two entities may be combined into a unified set of translation and protection tables and associated logic. Alternatively, the functions of the IOMMU may be carried out by a separate unit, which may even be located outside NIC 34 on bus 32. In virtualization scenarios, a second IOMMU might be used for address translation from the virtual machine address space to the physical address space. In some cases, when the NIC functionality is implemented in software, the mapping table might be implemented as a software table lookup on the host CPU.

When NIC 34 receives an RDMA request specifying a certain virtual address, packet processing circuitry 62 checks MPT 64 to determine whether the corresponding page 48 is present in memory 30. If so, NIC 34 can proceed immediately to execute the request. If the page is swapped out, however, circuitry 62 submits a translation request to CPU 28, and execution of the RDMA request is deferred until the translation request is resolved. When the RDMA request involves transmission of outgoing packets, which are to contain data from memory 30 or swap device 36, the data are inherently buffered in computer 22, so that the delay incurred due when page resolution is required does not generally lead to data loss. For incoming data packets received from network 24, NIC 34 may temporarily store data in a buffer 68 when the target page 48 is not available in memory 30. In general, however, the size of buffer 68 is very limited, and NIC 34 may need to drop the incoming packets if the required page 48 is not resolved immediately. The methods presented hereinbelow enable the NIC to make optimal use of available resources in memory 30 and buffer 68 in handling incoming packets, so as to minimize data loss and reduce added traffic on network 24 due to retransmissions that are required when incoming packets must be dropped. Specifically, the method enables retransmissions to be timed such that the page will be present by the time the retransmission happens, without using a worst-case scenario timer value.

Figure 2:
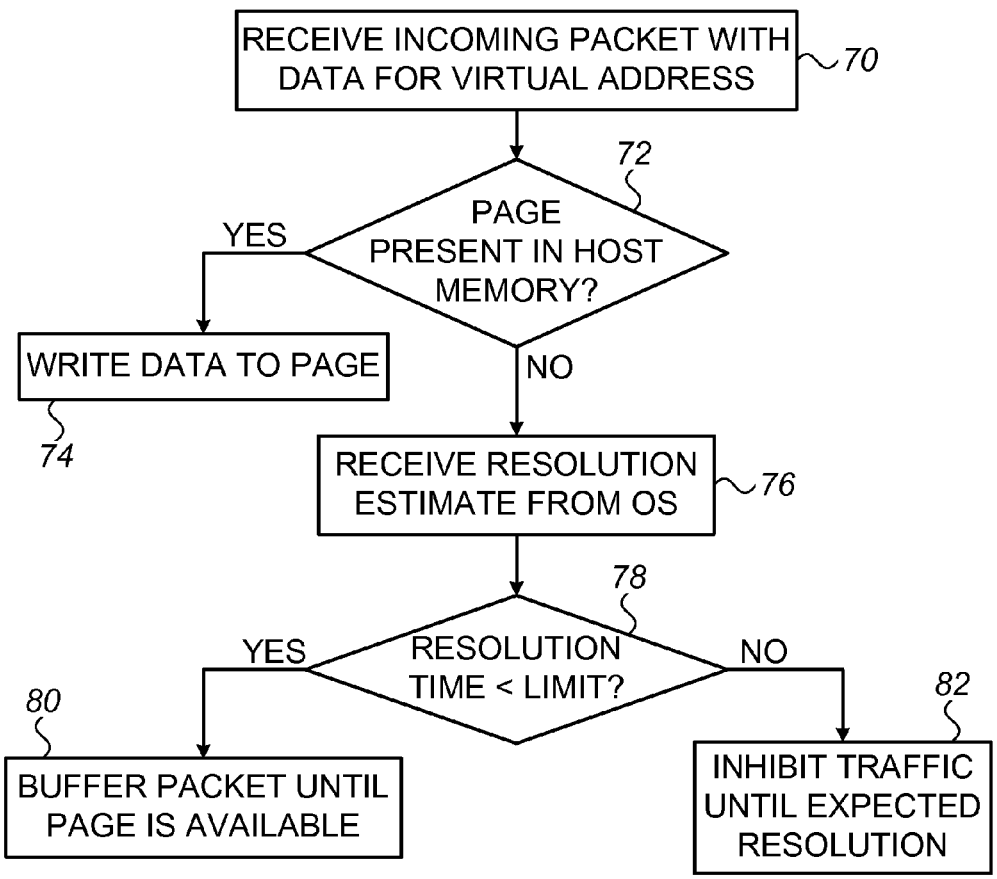
FIG. 2 is a flow chart that schematically shows a method for handling page faults, in accordance with an embodiment of the invention.

FIG. 2 is a flow chart that schematically shows a method for handling page faults, in accordance with an embodiment of the invention. The method is described, for the sake of concreteness and clarity, with reference to handling of incoming data packets by NIC 34 in system 20, according to the scenario outlined above. The principles of this method, however, may similarly be applied in other configurations and scenarios, involving not only network communications, but also other sorts of I/O operations and peripheral devices, as well as CPU-based implementations, as explained above.

The method of FIG. 2 is initiated when NIC 34 receives an incoming data packet from network 24, such as an RDMA packet, which specifies a virtual address in memory 30 to which the packet data are to be written, at a packet input step 70. Packet processing circuitry 62 checks the virtual address in the table maintained by IOMMU 66. If the page is listed in these tables as present, IOMMU 66 is able to provide the corresponding physical address in memory 30 at a page checking step 72. In this case, NIC 34 writes the data immediately to the appropriate page 48 in memory 30, at a data writing step 74. In an alternative embodiment, IOMMU 66 can access the host-managed page table 50 in its attempt to resolve the missing translation entry.

Figure 3:
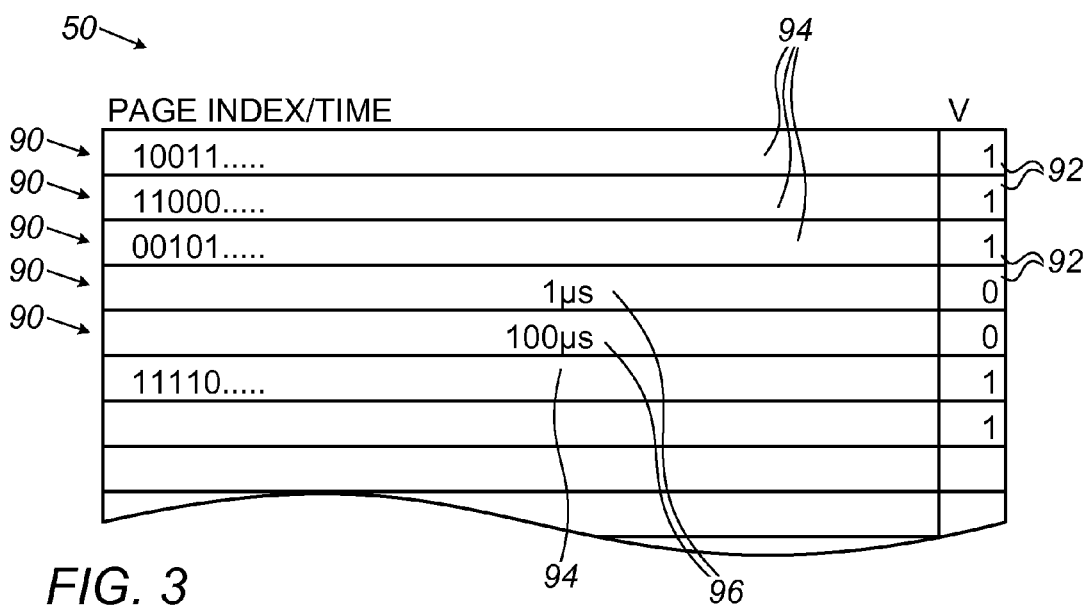
FIG. 3 is a block diagram that schematically illustrates a page table, in accordance with an embodiment of the invention.

On the other hand, if IOMMU 66 is unable to translate the virtual address to a current physical memory address at step 72, due to it being marked as not present, not writable or outside the allowed address range, packet processing circuitry 62 submits a request to CPU 28 to resolve the page. In response to this request, operating system 40 finds the desired page and then returns an estimate to NIC 34 of the length of time that will be required to make the page available in memory 30 (for example, by swapping the page back into the memory), at a page resolution step 76. Alternatively, IOMMU 66 may invoke operating system 40 directly or may read an entry from page table 50 (as illustrated in FIG. 3) at step 72, and may then inform packet processing circuitry 62 of the expected delay. As noted earlier, operating system 40 may report the estimated page resolution delay in actual terms of time (for example, the estimated number of microseconds to resolution) or in terms of the location of page, which is indicative of the time required. For example, if the page is in the page cache in memory 30 or in a quick-swap device, the time will be short, whereas the resolution time will be long if the page has to be retrieved from disk.

Operating system 40 can apply a variety of mechanisms in reporting the estimated time for page resolution at step 76. For example, the set of PRI messages now provided by ATS can be expanded to include a status code that indicates "request in progress, resolution will take approximately X microseconds." The estimate is based on the plan that the operating system will use to make the page available, such as whether or not disk access will be required, and, if so, whether a single disk access will be sufficient or multiple disk read/write operations will be needed to free up space in memory by swapping other pages out to disk. In this latter case, the estimated resolution time reported by the operating system at step 76 will depend on the expected number of disk accesses times the average disk latency.

As another option to provide quick page resolution, operating system 40 may fix a missing page by allocating a new page and filling it with zeros. Alternatively, operating system 40 may create a copy of an existing page in memory to split a copy-on-write mapping and provide a writable page. This option is applicable, for example, when as the result of a process performing a fork, all its pages are marked as read-only. An attempt to write to one of these pages will cause a page fault, with the operating creating a copy of the page and updating the mapping tables. Operating system 40 may provide an estimate at step 76 of the length of time that it will require to handling such a case. To facilitate implementation of this functionality, IOMMU 66 can track the type of allowed operations for each page table entries, and raise a page fault indication when the I/O device attempts to perform a write to a page entry marked as read-only, In some cases, pages may be present in the host page table but marked as read-only. In such cases, the host processor may indicate the length of time required to make them writable, for example by using a global register indicating the memory pressure. This indication is useful, for example, in estimating the time that will be required to perform a copy-on-write when the page entry points to a shared, read-only page. The memory pressure register, which is globally visible in software, indicates how long it will take to create a copy of the page. If there is memory available, copy creation will be relatively fast, whereas if the operating system will have to swap out a memory page to disk to allocate the memory page, the process will be longer.

NIC 34 decides how to handle the packet that was received at step 70 depending upon the length of the expected delay until the desired page will be resolved, at a handling decision step 78. For this purpose, the NIC may set one or more time limits or thresholds, to distinguish quick resolution from delayed resolution. These limits can depend on system configuration and operating conditions and may change over time. For example, the limit for distinguishing between quick and delayed resolution can depend upon the rate of incoming traffic and latency of network 24, as well as the availability of memory in buffer 68 to buffer incoming packets.

When the expected resolution time is found at step 78 to be less than the limit, NIC 34 can buffer the current packet in buffer 68, at a buffering step 80. Once the page becomes available, NIC 34 writes the packet data from buffer 68 to memory 30, with only minimal delay relative to the normal (zero-copy) data handling of step 74 and without significantly disturbing the flow of incoming data from network 24.

On the other hand, when the resolution time at step 78 is above the limit, NIC 34 will typically send a control message over network 24 to the source of the data (for example, computer 26) in order to inhibit further transmission during the delay period, at a traffic inhibition step 82. For example, NIC 34 may instruct computer 26 to pause transmission for a length of time that depends on the predicted page resolution delay, possibly by sending an RNR NACK packet back to computer 26. Additionally or alternatively, NIC 34 may instruct computer 26 to retransmit the current packet (and resume transmission of the flow to which the packet belongs), for example by transmitting an unsolicited ACK packet to computer 26, so that the data will start to reach NIC 34 approximately at the time that resolution of the page fault is expected.

Alternatively, NIC 34 may use other work flows to handle varying resolution delays, as reported at step 76. For example, the NIC may initially buffer the incoming packet in buffer 68 in anticipation of a quick resolution of the desired page, and if the resolution does not arrive in time, may discard the packet and request retransmission by computer 26. If the retransmission occurs before the page fault is resolved, NIC 34 may discard the retransmitted packet and request a further retransmission at step 82, with a delay based on the latency of swap device 36.

The estimated resolution delay at step 76 may be reduced if the page in question is already in the process of being swapped back into memory 30. This sort of situation can occur in the case of a duplicate resolution request for a page that was already requested, either for the same packet flow or a different flow. To handle this sort of situation, either IOMMU 66 or MMU 42 can track the list of pages that have been requested but not yet resolved and can use this information in computing and reporting estimated resolution delays to NIC 34. Alternatively or additionally, the NIC itself may keep a list of requested pages and the expected delay times. In this latter case, upon receiving a second packet with data directed to the same, as-yet-unresolved page, NIC 34 can directly instruct computer 26 to stall the flow in question for the appropriate length of time without any involvement by operating system 40 at this stage. These sorts of reuse (by MMU 42, IOMMU 66 or NIC 34) of delay estimates that were received previously are useful in reducing the load on processor 28 and reducing software-induced latency in handling of page faults.

NIC 34 can use the estimated resolution delays reported at step 76 not only in inhibiting transmissions by computer 26, but also in making its own internal scheduling decisions. For example, if NIC 34 has received a report that resolution of a given page that is required for a certain task will take 10 µs, and rescheduling the task in packet processing circuitry 62 takes 3 µs, NIC 34 can initiate rescheduling after 7 µs, so that the actual task will begin exactly when the page is resolved.

FIG. 3 is a block diagram that schematically illustrates page table 50, in accordance with another embodiment of the invention. This is a simplified view of the page table, intended to show only how page table entries 90 can be used to provide estimates of page swap delays, in addition to the conventional use of such entries for page translation. The remaining features of table 50 are operating system-dependent and will be apparent to those skilled in the art.

Each entry 90 is keyed by a corresponding virtual address in memory 30. For pages 48 that are currently available and mapped in memory 30, page entry 90 contains a page index 94, which is used by packet processing circuitry 62 in translating virtual memory addresses to physical addresses on that page, as is known in the art. (In some embodiments, page index 94 is also used by MMU 42 in execution of applications in a virtual address space.) A validity flag 92 in each entry is set to indicate that the mapping for the corresponding page is valid.

When a page is invalidated, flag 92 in the corresponding entry 90 is reset. In this case, in the present embodiment, MMU 42 or another component of operating system 40 updates the page index field to hold an estimated delay value 96, depending on the estimated time that will be required to reload the page into memory 30 from its present location. As noted earlier, delay value 96 may be small for pages located in the page cache in memory 30 and much greater for pages that have been removed to swap device 36.

Thus, the embodiment of FIG. 3 enables IOMMU 66 and/or other elements of processing circuitry 62 to find out how long resolution of a given page of virtual memory will take before even requesting the page from MMU 42 and incurring a page fault. NIC 34 can use this information in handling incoming traffic from network 24 more efficiently, including rapid inhibition of flows that are directed to virtual pages that are not currently available in memory 30. This approach may also be useful in reducing requirements for internal messaging between operating system 40 and IOMMU 66.

It will be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. A method for data transfer, comprising:
receiving in a data transfer operation data to be written by a peripheral device to a specified virtual address in a random access memory (RAM) of a host computer;
detecting, upon receiving the data, that a page that contains the specified virtual address is marked as not present in a page table of the host computer;
receiving in the peripheral device a notification that the page is not present and an estimate of a length of time that will be required to make the page available;
selecting a mode for handling of the data transfer operation depending upon the estimate; and
completing the data transfer operation in accordance with the selected mode.

2. The method according to claim 1, wherein detecting that the page is marked as not present comprises looking up a page entry in a page table, and finding the page entry to be invalid.

3. The method according to claim 2, wherein receiving the notification comprises reading the estimate from the page entry, wherein the estimate is written to the page table by an operating system of the host computer.

4. The method according to claim 1, wherein receiving the notification comprises submitting a page request from the peripheral device to an operating system of the host computer, and receiving a response from the operating system providing the estimate.

5. The method according to claim 1, wherein receiving the estimate comprises receiving an indication of a location of the page that is not present, and estimating the length of time that will be required to swap the page back into the RAM depending upon the location.

6. The method according to claim 5, wherein the location is selected from a list of locations consisting of a page cache in the RAM, a quick-swap device, and a disk.

7. The method according to claim 1, wherein completing the data transfer operation comprises scheduling a time for completion of the data transfer operation after the estimated length of time has elapsed, and suspending the data transfer operation until the scheduled time.

8. The method according to claim 1, wherein selecting the mode comprises, when the estimated length of time is less than a predefined limit, buffering the data in a local memory of the peripheral device until the page has been swapped back into the RAM.

9. The method according to claim 1, wherein selecting the mode comprises, when the estimated length of time is greater than a predefined limit, stalling the data transfer operation for a delay period selected responsively to the estimate.

10. The method according to claim 9, wherein the data transfer operation comprises reception of data transmitted over a network to the peripheral device, and wherein stalling the data transfer operation comprises sending a control message over the network to a source of the data so as to inhibit further transmission during the delay period.

11. The method according to claim 1, wherein receiving the estimate of the length of time comprises reading a value from a global register and applying the value in making the estimate.

12. The method according to claim 11, wherein the value read from the global register is indicative of a memory pressure experienced by an operating system of the host computer.

13. The method according to claim 11, wherein the global register resides in the RAM of the host computer.

14. The method according to claim 11, wherein reading the value from the global register comprises selecting the global register for use in making the estimate according to a page table entry associated with the specified virtual address.

15. The method according to claim 11, wherein making the estimate comprises adding the value read from the global register to a latency estimation provided in a page table entry associated with the specified virtual address.

16. A method for data transfer, comprising:
receiving in a host computer page requests from a peripheral device coupled to the host computer with respect to specified pages of virtual memory in a random access memory (RAM) of the host computer;
providing notifications from the host computer to the peripheral device with respect to whether the specified pages are present in the RAM; and
for the pages that are not present, providing from the host computer to the peripheral device estimates of lengths of time that will be required to swap the pages back into the RAM.

17. The method according to claim 16, wherein providing the notifications comprises invalidating page entries corresponding to the pages that are not present in a page table maintained by the host computer, and wherein providing the estimates comprises writing indications in the invalidated page entries of the lengths of time required to swap the corresponding pages back into the RAM.

18. The method according to claim 16, wherein providing the estimates comprises sending page resolution notifications from the host processor to the peripheral device.

19. The method according to claim 16, wherein providing the estimates comprises providing indications of locations of the swapped-out pages, wherein the lengths of time that will be required to swap the pages back into the RAM depend upon the location.

20. The method according to claim 19, wherein the locations are selected from a list of possible locations consisting of a page cache in the RAM, a quick-swap device, and a disk.

21. Data transfer apparatus, comprising:
a host interface for connection to a host processor having a random access memory (RAM) and one or more swap devices;
a network interface, which is configured to receive data sent over a network and destined for a specified virtual address in the RAM; and
processing circuitry, which is coupled between the host interface and the network interface and is configured to detect that a page that contains the specified virtual address is marked as not present in a page table maintained by the host processor, to receive an estimate of a length of time that will be required to swap the page back into the RAM, to select a mode for handling of the data depending upon the estimate, and to handle the data in accordance with the selected mode.

22. The apparatus according to claim 21, wherein the processing circuitry is configured to detect that the page is marked as not present by looking up a page entry in a page table, and finding the page entry to be invalid.

23. The apparatus according to claim 22, wherein the processing circuitry is configured to read from the page entry the estimate of the length of time that will be required to swap the page back into the RAM, wherein the estimate is written to the page table by an operating system of the host computer.

24. The apparatus according to claim 21, wherein the processing circuitry is configured to submit a page request to an operating system of the host computer, and to receive a response from the operating system providing the estimate of the length of time that will be required to swap the page back into the RAM.

25. The apparatus according to claim 21, wherein the estimate comprises an indication of a location of the swapped-out page, and wherein the processing circuitry is configured to estimate the length of time that will be required to swap the page back into the RAM depending upon the location.

26. The apparatus according to claim 25, wherein the location is selected from a list of locations consisting of a page cache in the RAM, a quick-swap device, and a disk.

27. The apparatus according to claim 21, wherein the processing circuitry is configured to schedule a time for completion of writing the data to the RAM after the estimated length of time has elapsed, and to suspend handling of the data until the scheduled time.

28. The apparatus according to claim 21, wherein selecting the mode comprises, when the estimated length of time is less than a predefined limit, buffering the data in a local memory of the apparatus until the page has been swapped back into the RAM.

29. The apparatus according to claim 21, wherein selecting the mode comprises, when the estimated length of time is greater than a predefined limit, stalling transfer of the data over the network for a delay period selected responsively to the estimate.

30. The apparatus according to claim 29, wherein stalling the transfer of the data comprises sending a control message over the network to a source of the data so as to inhibit further transmission during the delay period.

31. A method for data transfer, comprising:
receiving, in a data transfer operation of a given type, data to be written by a peripheral device to a specified virtual address of a host computer;
detecting, upon receiving the data, that a page that contains the specified virtual address is marked as not accessible for the given type of operation or as not present in a page table of the host computer;
receiving in the peripheral device a notification that the page is not available and an estimate of a length of time that will be required to make the page available;
selecting a mode for handling of the data transfer operation depending upon the estimate; and
completing the data transfer operation in accordance with the selected mode.

32. A method for data transfer, comprising:
receiving in a host computer page requests from a peripheral device coupled to the host computer with respect to specified pages of virtual memory in the host computer for operations of a given type to be performed by the peripheral device;
providing notifications from the host computer to the peripheral device with respect to whether the specified pages are present and are available for the given type of operation; and
for the pages that are not present or are not available, providing from the host computer to the peripheral device estimates of lengths of time that will be required to make the pages available.

* * * * *